United States Patent
Chae et al.

(10) Patent No.: US 10,624,100 B2
(45) Date of Patent: Apr. 14, 2020

(54) METHOD AND APPARATUS FOR TRANSMITTING AND RECEIVING SIGNAL RELATED TO QCL OF DEVICE-TO-DEVICE COMMUNICATION TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Youngtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/779,794

(22) PCT Filed: Nov. 28, 2016

(86) PCT No.: PCT/KR2016/013782
§ 371 (c)(1),
(2) Date: May 29, 2018

(87) PCT Pub. No.: WO2017/095095
PCT Pub. Date: Jun. 8, 2017

(65) Prior Publication Data
US 2018/0376471 A1    Dec. 27, 2018

Related U.S. Application Data

(60) Provisional application No. 62/261,262, filed on Nov. 30, 2015.

(51) Int. Cl.
*H04W 4/00* (2018.01)
*H04W 72/04* (2009.01)
(Continued)

(52) U.S. Cl.
CPC ......... *H04W 72/048* (2013.01); *H04L 5/0023* (2013.01); *H04L 5/0044* (2013.01);
(Continued)

(58) Field of Classification Search
USPC ....... 370/236, 241, 246, 252, 315, 328, 329, 370/436, 458, 464, 468, 492, 500, 501
See application file for complete search history.

(56) References Cited

U.S. PATENT DOCUMENTS

| 2013/0279358 A1* | 10/2013 | Nagata | H04W 24/02 370/252 |
| 2013/0279437 A1* | 10/2013 | Ng | H04W 48/16 370/329 |

(Continued)

FOREIGN PATENT DOCUMENTS

| WO | 2014112938 A1 | 7/2014 |
| WO | 2015152581 A1 | 10/2015 |

(Continued)

OTHER PUBLICATIONS

Nokia, Nokia Siemens Networks, "On Quasi-co-located Antenna Ports", 3GPP TSG RAN WG1 Meeting #70, Aug. 13-17, 2012, R1-123658, XP050661533.

(Continued)

*Primary Examiner* — Kwang B Yao
*Assistant Examiner* — Nguyen H Ngo
(74) *Attorney, Agent, or Firm* — Dentons US LLP

(57) ABSTRACT

An embodiment of the present invention relates to a method for a first terminal to receive a signal transmitted by a second terminal in a wireless communication system, the method comprising the steps of: receiving a physical sidelink control channel (PSCCH) transmitted by the second terminal; and receiving a physical sidelink shared channel (PSSCH) associated with the PSCCH, wherein when demodulating the (Continued)

PSSCH, the first terminal uses quasi co-located (QCL) assumption according to a relationship between the PSCCH and the reception timing of the PSSCH.

11 Claims, 9 Drawing Sheets

(51) Int. Cl.
    *H04L 27/26*     (2006.01)
    *H04L 5/00*     (2006.01)
    *H04W 28/02*     (2009.01)
    *H04W 72/12*     (2009.01)
    *H04W 72/14*     (2009.01)
    *H04W 88/04*     (2009.01)

(52) U.S. Cl.
    CPC ............ *H04L 5/0053* (2013.01); *H04L 27/26* (2013.01); *H04W 28/0221* (2013.01); *H04W 72/1215* (2013.01); *H04W 72/14* (2013.01); *H04W 88/04* (2013.01)

(56) References Cited

U.S. PATENT DOCUMENTS

| | | | |
|---|---|---|---|
| 2014/0092816 A1* | 4/2014 | Ito | H04W 72/12 370/329 |
| 2014/0119266 A1 | 5/2014 | Ng et al. | |
| 2014/0328329 A1* | 11/2014 | Novlan | H04W 72/042 370/336 |
| 2015/0133112 A1* | 5/2015 | Wang | H04W 76/14 455/426.1 |
| 2015/0289235 A1 | 10/2015 | Park et al. | |
| 2015/0312958 A1* | 10/2015 | Cheng | H04B 7/0413 370/252 |
| 2016/0128115 A1* | 5/2016 | Panteleev | H04W 72/121 370/329 |
| 2016/0223639 A1* | 8/2016 | Davydov | G01S 5/04 |
| 2016/0302203 A1* | 10/2016 | Liu | H04L 5/001 |
| 2017/0237542 A1* | 8/2017 | Harrison | H04L 5/0035 370/329 |
| 2018/0206140 A1* | 7/2018 | Panteleev | H04L 5/0053 |

FOREIGN PATENT DOCUMENTS

| | | |
|---|---|---|
| WO | 2015156634 A1 | 10/2015 |
| WO | 2015174805 A1 | 11/2015 |

OTHER PUBLICATIONS

LG Electronics, "Signaling for quasi co-location assumptions and PDSCH rate matching", 3GPP TSG RAN WG1 Meeting #70bis, Aug. 8-12, 2012, R1-124316, XP050662216.

* cited by examiner (a)

(b)

(a)

(b)

METHOD AND APPARATUS FOR TRANSMITTING AND RECEIVING SIGNAL RELATED TO QCL OF DEVICE-TO-DEVICE COMMUNICATION TERMINAL IN WIRELESS COMMUNICATION SYSTEM

This application is a National Stage Application of International Application No. PCT/KR2016/013782, filed on Nov. 28, 2016, which claims the benefit of U.S. Provisional Application No. 62/261,262, filed on Nov. 30, 2015, all of which are hereby incorporated by reference in their entirety for all purposes as if fully set forth herein.

TECHNICAL FIELD

Following description relates to a wireless communication system, and more particularly, to a method of transmitting and receiving a signal related to QCL (quasi co-located) assumption and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

A technical task of the present invention is to respectively apply QCL assumption according to a format of a physical channel and/or a type of a signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a signal, which is received by a first UE from a second UE in a wireless communication system, includes the steps of receiving a PSCCH (physical sidelink control channel) transmitted by the second UE, and receiving a PSSCH (physical sidelink shared channel) associated with the PSCCH. In this case, when the PSSCH is demodulated, the first UE can use QCL (quasi co-located) assumption according to a reception timing relation between the PSCCH and the PSSCH.

To further achieve these and other advantages and in accordance with the purpose of the present invention, according to a different embodiment, a first UE receiving a signal from a second UE in a wireless communication system includes a transmitter and a receiver, and a processor, the processor configured to receive a PSCCH transmitted by the second UE, the processor configured to receive a PSSCH associated with the PSCCH. In this case, when the PSSCH is demodulated, the first UE can use QCL (quasi co-located) assumption according to a reception timing relation between the PSCCH and the PSSCH.

If the PSCCH and the PSSCH are received in the same subframe, the first UE may assume that the PSCCH and the PSSCH are QCLed.

If the PSSCH is received within predetermined time after the PSCCH is received, the first UE may assume that the PSCCH and the PSSCH are QCLed.

The predetermined time can be differently determined according to a format of the PSCCH.

If the first UE assumes QCL, the first UE may consider that at least one selected from the group consisting of delay spread, Doppler spread, Doppler shift, average gain, average delay, and frequency shift is identically used not only for demodulating the PSSCH but also for demodulating the PSCCH.

If the PSSCH is received within predetermined time after the PSCCH is received, the first UE assumes a QCL behavior A when the PSSCH is demodulated and if the PSSCH is received after the predetermined time after the PSCCH is received, the first UE may assume a QCL behavior B when the PSSCH is demodulated.

The QCL behavior A corresponds to an assumption that Doppler shift, Doppler spread, average delay, and delay spread are common and the QCL behavior B may correspond to an assumption that Doppler shift and Doppler spread are common.

The PSCCH and the PSSCH can be transmitted via the same antenna port.

When a PSBCH (physical sidelink broadcast channel) is demodulated, the first UE may assume that the PSBCH and an SLSS (sidelink synchronization signal) are QCLed.

The first UE may assume that the PSBCH and the SLSS are QCLed only when a UE, which has transmitted the SLSS, is identical to a UE, which has transmitted the PSBCH.

The first UE can receive information on whether or not the PSBCH and the SLSS are QCLed from a network.

If the first UE operates on a predetermined carrier, the UE may assume that the PSBCH and the SLSS are QCLed.

Advantageous Effects

According to the present invention, it is able to achieve both accuracy and efficiency of channel estimation.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
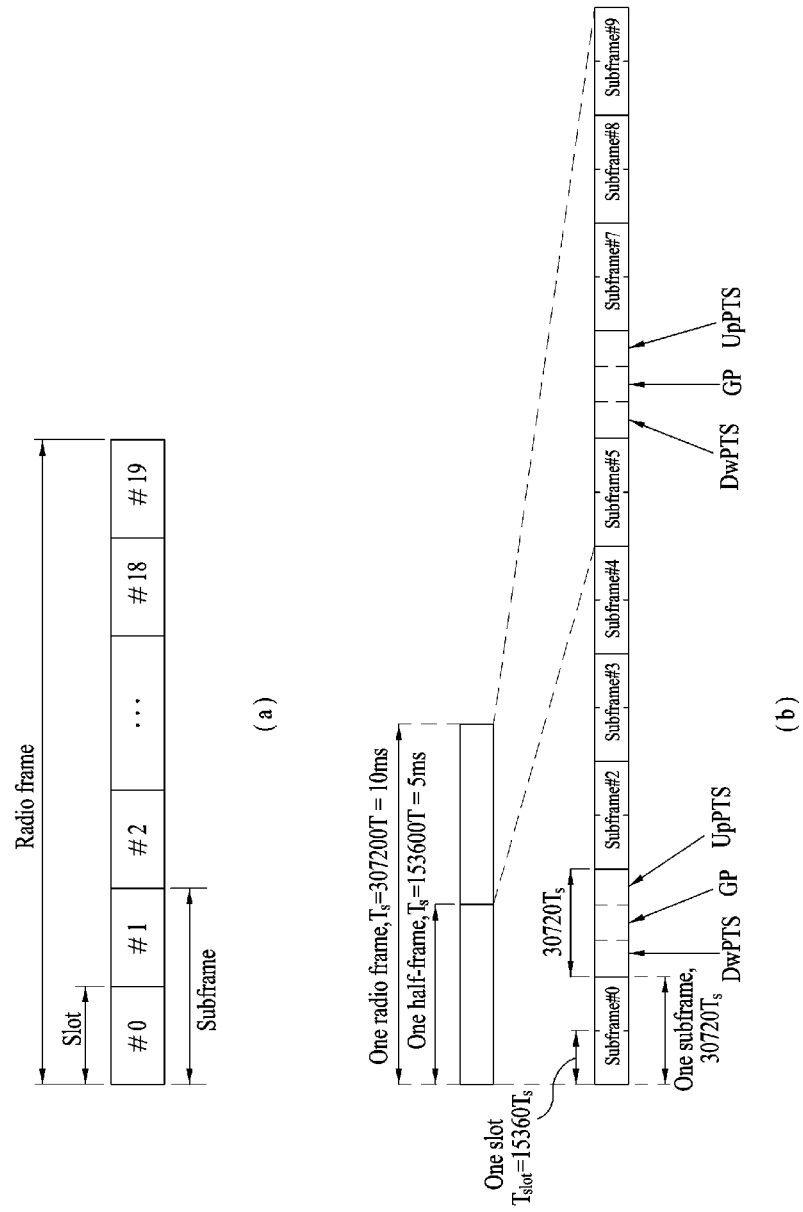
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
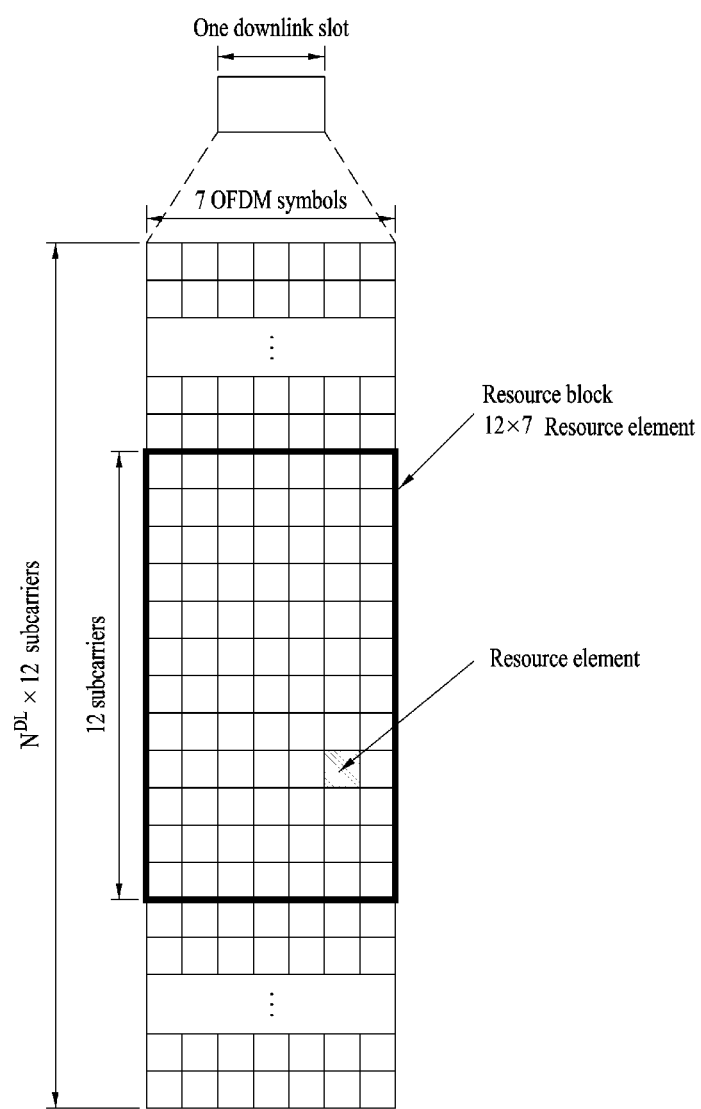
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
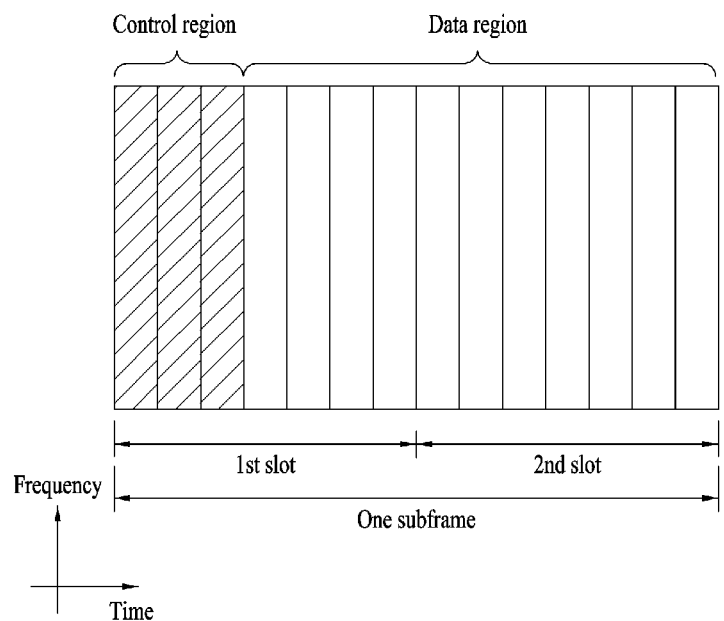
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
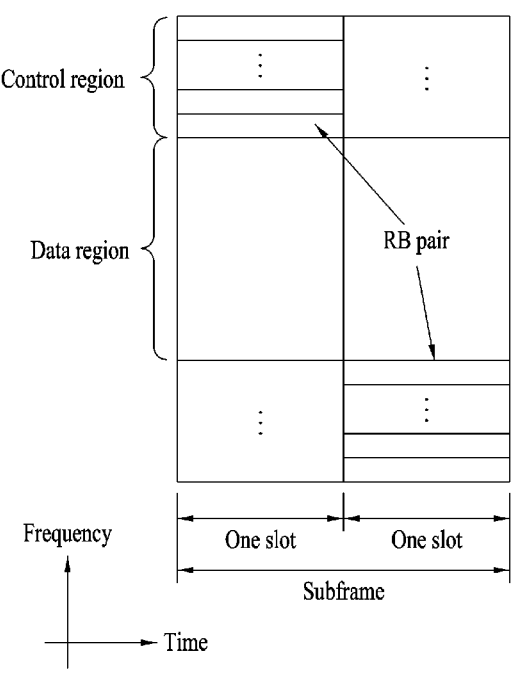
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
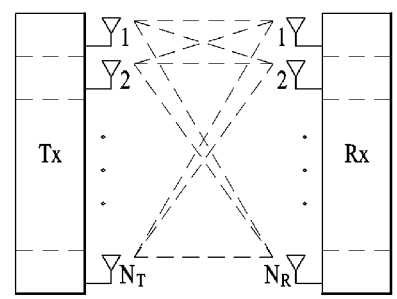
FIG. 5 is a diagram for a configuration of a wireless communication system having multiple antennas.
Figure 5:
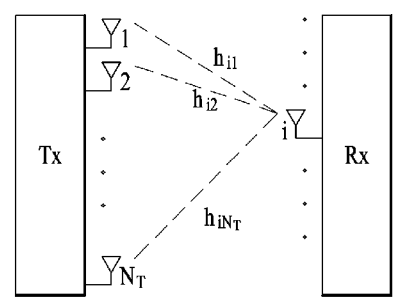

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
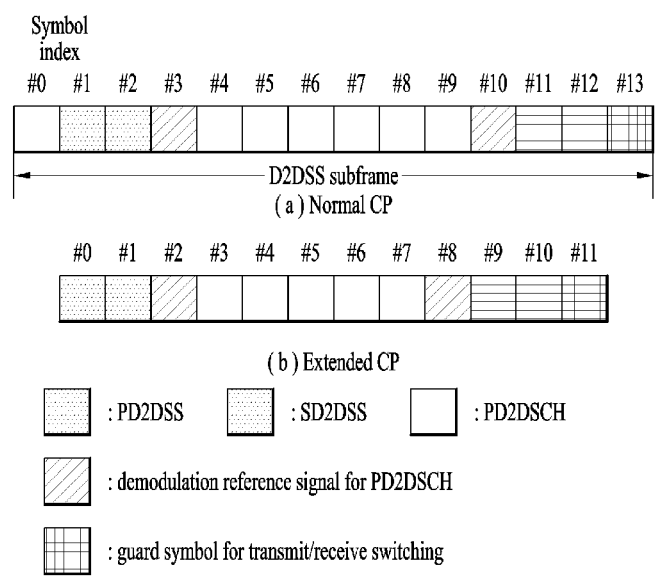
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
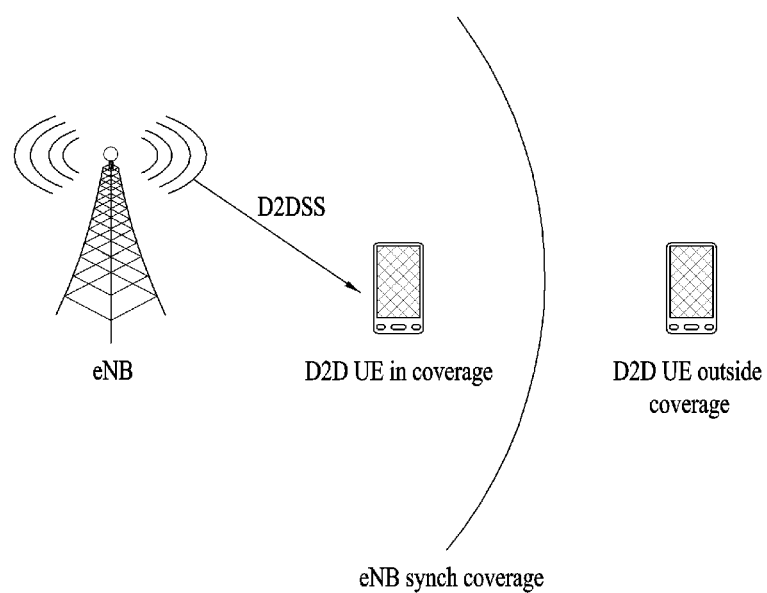
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
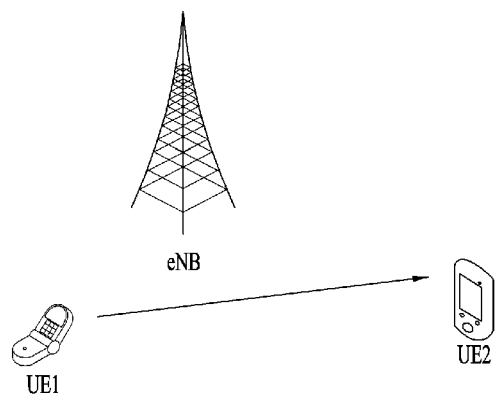
FIG. 8 is a diagram for an example of a D2D resource pool for performing D2D communication.
Figure 8:
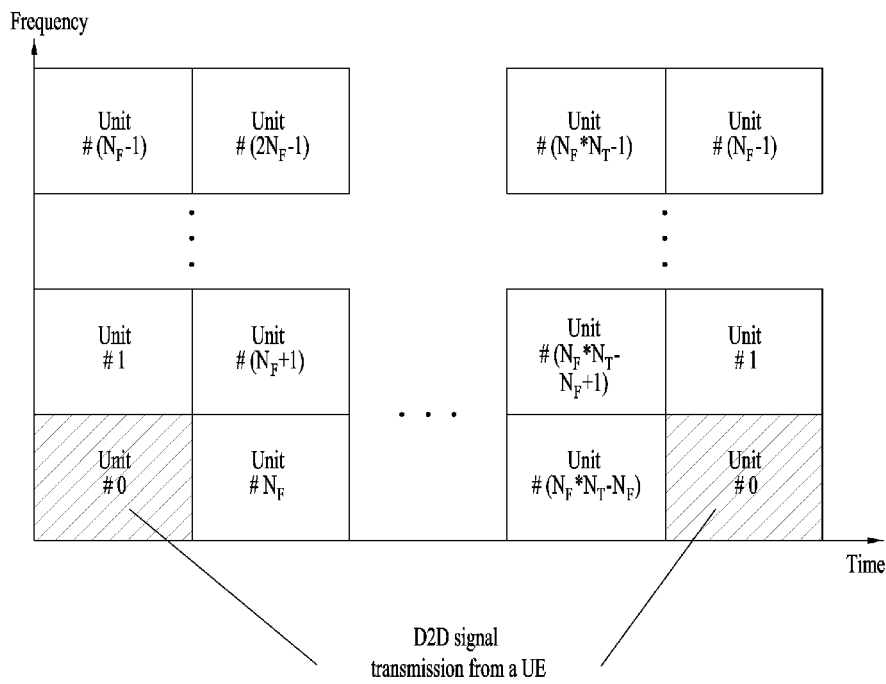

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
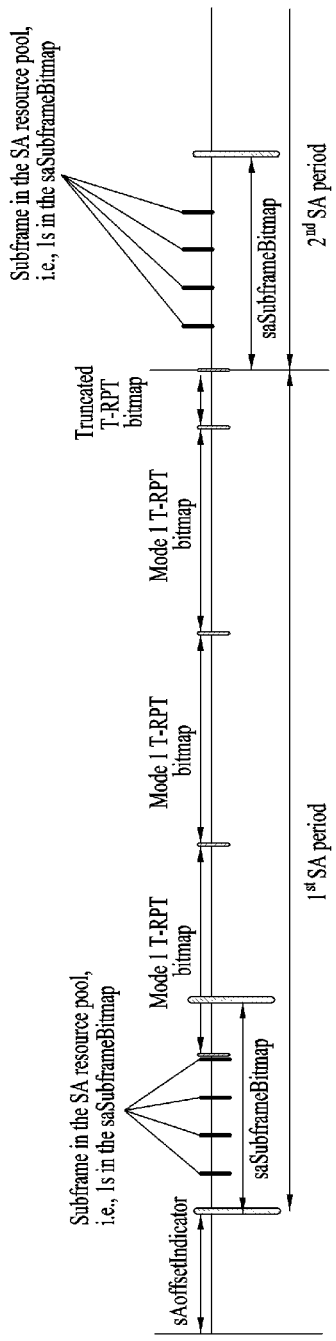
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

In the following, when demodulation is performed on each channel in D2D or V2X communication, a method of efficiently enhancing performance is explained based on the aforementioned description.

According to one embodiment of the present invention, a first UE receives a PSCCH transmitted by a second UE and can receive a PSSCH associated with the PSCCH. In this case, when demodulation is performed on the PSSCH, the first UE can use/apply/perform QCL (quasi co-located) assumption according to a reception timing relation between the PSCCH and the PSSCH. In the following description, unless there is a special citation, when QCL assumption is performed, it means that a larger scale fading parameter (all or a part of delay spread, Doppler spread, Doppler shift, average gain, average delay, and frequency shift) among channel estimation information is shared. In particular, when the first UE receives the PSSCH, if the PSCCH is received according to the reception timing relation between the PSCCH and the PSSCH, the first UE uses at least a part of the large scale fading parameters among the channel estimation information.

Specifically, if the PSCCH and the PSSCH are received in the same subframe, the first UE may assume that the PSCCH and the PSSCH are QCLed. In particular, if the QCL is assumed, the first UE may consider that at least one selected from the group consisting of delay spread, Doppler spread, Doppler shift, average gain, average delay, and frequency shift is identically used not only for demodulating the PSSCH but also for demodulating the PSCCH. In this case, the PSCCH and the PSSCH can be transmitted via the same antenna port. When the PSCCH and the PSSCH are transmitted in the same subframe, if QCL is assumed, frequency offset information obtained on the PSCCH can be utilized for demodulating the PSSCH. In this case, similar to the abovementioned case, a network can signal information on whether or not the QCL is assumed between the PSCCH and the PSSCH. Or, if the PSSCH and the PSCCH are transmitted in the same subframe, a UE may determine that QCL of a specific type is assumed. Additionally, if the PSCCH and the PSSCH are not received in the same subframe, the first UE may not assume that the PSCCH and the PSSCH are QCLed. In particular, if the PSCCH and the PSSCH are transmitted in the same subframe in D2D, V2X, and the like, it may be able to reuse channel estimation information to increase efficiency. If the PSCCH and the PSSCH are transmitted in a different subframe, it may not reuse the channel estimation information for accuracy. This is especially helpful when moving speed of a UE is high.

Or, if the PSSCH is received within predetermined time after the PSCCH is received, the first UE may assume that the PSCCH and the PSSCH are QCLed. In particular, if the QCL is assumed, the first UE may consider that at least one selected from the group consisting of delay spread, Doppler spread, Doppler shift, average gain, average delay, and frequency shift is identically used not only for demodulating the PSSCH but also for demodulating the PSCCH. In this case, the PSCCH and the PSSCH can be transmitted via the same antenna port. (In particular, an antenna port can be identically configured.) Additionally, if the PSSCH is not received within the predetermined time after the PSCCH is received, the first UE may assume that the PSCCH and the PSSCH are not QCLed. The predetermined time can be differently determined according to the PSCCH format. As a specific example, a PSCCH format configured for V2X and a PSCCH format configured for IoT (Internet of Thing) can be differently handled. In case of the V2X, since mobility is high and moving speed is also fast, the predetermined time is configured by relatively short time. In case of the IoT, since mobility is very low and moving speed is also low, the predetermined time can be configured by relatively long time. In particular, in case of an IoT terminal, since the IoT terminal has low mobility, although relatively long time is elapsed, the IoT terminal may use QCL assumption. As a result, a low-power IoT terminal may have a big gain in estimating a channel.

In the foregoing description, if the PSSCH is received within predetermined time after the PSCCH is received, the first UE assumes a QCL behavior A when the PSSCH is demodulated. If the PSSCH is received after the predetermined time after the PSCCH is received, the first UE may assume a QCL behavior B when the PSSCH is demodulated. In this case, it may be able to determine in advance that Doppler shift, Doppler spread, average delay, and delay spread are common to the QCL behavior A and Doppler shift and Doppler spread are common to the QCL behavior B. A transmission UE can explicitly signal The QCL behavior to a reception UE via a control channel (PSCCH or PSBCH). For example, a field for indicating a QCL behavior/whether to apply QCL between the PSSCH and the PSCCH can be transmitted in a manner of being included in the PSCCH. Or, a subframe spacing to which QCL is applicable between PSSCHs can be transmitted in a manner of being included in the PSCCH. Having received the PSCCH, the reception UE can perform a QCL operation according to the QCL behavior indicated by the transmission UE. For example, a UE may autonomously identify a moving speed or estimate a level of a channel variation and may be then able to directly signal information on whether or not QCL is assumed and/or information on a QCL type.

Or, if a PSCCH is transmitted and a PSSCH is scheduled by the PSCCH, it may assume QCL for a prescribed SA period. According to the abovementioned method, QCL assumption can be differently configured according to a difference between a subframe index of the PSCCH and a subframe index of the PSSCH. Specifically, it may be able to differently configure a QCL behavior. For example, if the PSSCH is transmitted within prescribe time after the PSCCH is transmitted, QCL behavior A is assumed. If the PSSCH is transmitted after the prescribe time, a QCL behavior B is assumed. In this case, the QCL behaviors A and B can be determined in advance or can be signaled by a network in advance via higher layer signaling. For example, it may be able to determine in advance that the QCL behavior A assumes QCL for Doppler shift, Doppler spread, average delay, and delay spread and the QCL behavior B assumes QCL for Doppler shift and/or Doppler spread only.

Meanwhile, if an antenna port is differently configured between the PSCCH and the PSSCH, whether to assume QCL can be determined according to the antenna port. Or, the PSCCH and the PSSCH can differently configure an antenna port according to a type of a format. For example, in case of using a PSCCH format 0, it may be able to assume an antenna port identical to an antenna port of the PSSCH by maintaining a legacy operation. On the contrary, in case of using a PSCCH format 1, it may be able to configure an antenna port different from an antenna port of the PSSCH. In particular, the reasons why a different antenna port is configured according to a channel are described in the following. i) Due to high mobility, a wireless channel state of transmitting each physical channel is considerably different. ii) An RS can be configured in a different form according to each of the PSCCH, the PSSCH, and the PSDCH (For example, an RS position and a form can be differently configured between the PSCCH and the PSSCH). iii) Power can be differently configured between the PSCCH and the PSSCH (When the power is differently configured, if PSSCH demodulation is performed using a channel of the PSCCH, an error may occur. In particular, when the PSSCH uses QAM modulation, the PSSCH and the PSSCH are contiguously FDMed in frequency domain, the power of the PSCCH is boosted and the power of the PSCCH is different from the power of the PSSCH, if the channel of the PSCCH is used for demodulating the PSSCH by interpolating the channel of the PSCCH in frequency domain, an error may occur).

Meanwhile, when the PSCCH and the PSSCH are transmitted in the same subframe, it may configure the same antenna port. When the PSCCH and the PSSCH are transmitted in a different subframe, it may configure a different antenna port. Or, if the PSSCH is transmitted within prescribed timing after the PSCCH is transmitted, it may configure the same antenna port. If the PSSCH is transmitted after the prescribed timing, it may configure a different antenna port for the PSSCH. This is aimed for differently configuring a demodulation behavior according to a difference between the timing of transmitting the PSCCH and the timing of transmitting the PSSCH. In particular, different QCL assumption can be implicitly configured according to whether or not an antenna port is transmitted at the same time.

Meanwhile, when the PSCCH and the PSSCH are transmitted in the same subframe, if transmit power (power or PDS) is differently configured or the channels are discontinuously transmitted in frequency domain with an interval equal to or greater than a prescribed interval, although the same antenna port is assumed, it is unable to use radio channel information of each physical channel for mutual demodulation. A method of configuring PSCCH and PSSCH using a different antenna port is proposed in consideration of the abovementioned possibility. Or, when the channels are configured by the same antenna port and power is different, if the channels are discontinuously arranged with an interval equal to or greater than a prescribed interval, the present invention proposes not to perform channel interpolation. Of course, such a parameter as Doppler shift, a frequency offset, and the like can be shared between channels different from each other (QCL). A clear QCL behavior can be determined in advance or can be signaled by a network via physical layer signaling or higher layer signaling.

Meanwhile, QCL relation between the PSCCH and the PSSCH can also be implicitly indicated according to a resource allocation scheme or a resource pool configuration scheme. For example, if a resource is allocated based on a sensing-based scheduling scheme or a semi-persistent scheduling (reservation) scheme, it may be preferable to transmit the PSCCH and the PSSCH in contiguous subframes or in the same subframe at the same time. In this case, the PSCCH and the PSSCH assume a QCL behavior (determined in advance or configured by a network). In case of using random resource allocation, it may be advantageous that the PSCCH and the PSSCH are transmitted in subframes separated from each other. Since the PSCCH and the PSSCH can be transmitted in a manner of being apart from each other, it may not assume QCL between the PSCCH and the PSSCH. Or, it may operate with a predetermined QCL behavior (conservative QCL behavior, i.e., a partial parameter is QCLed only). Or, when a resource pool is configured, if PSCCH and PSSCH are transmitted at the same time in the aspect of a single UE, QCL is assumed. Otherwise, it may not assume QCL.

Meanwhile, as an embodiment which is used together with QCL example between the PSCCH and the PSSCH or a separate embodiment, QCL assumption between a PSBCH (physical sidelink broadcast channel) and an SLSS (sidelink synchronization signal) can be defined as follows.

Specifically, when a first UE demodulates the PSBCH, the first UE may assume that the PSBCH and the SLSS are QCLed. The UE may assume that the PSBCH and the SLSS are QCLed only when a UE, which has transmitted the SLSS, is identical to a UE, which has transmitted the PSBCH. To this end, whether to perform QCL between the PSBCH and the SLSS can be determined by a network. Or, whether to perform QCL between the PSBCH and the SLSS can be determined according to an operation carrier. For example, if the first UE operates on a predetermined carrier, the UE may assume that the PSBCH and the SLSS are QCLed.

When a UE transmitting a synchronization signal is not matched with a UE transmitting a PSBCH in D2D, V2X, and the like (i.e., when a transmission entity is different), the abovementioned configuration makes QCL assumption not to be used to increase accuracy of channel estimation. Moreover, when a transmission entity is the same, the configuration can increase efficiency of channel estimation. More specifically, an SLSS can be transmitted by both a discovery capable UE and a communication capable UE, whereas a PSBCH can be transmitted by a communication capable UE only. In this case, if the SLSS is used for demodulating the PSBCH, since an entity and a channel for transmitting the PSBCH and the SLSS are different, an error occurs. If a UE transmitting the SLSS only does not exist, in other word, if a UE transmitting the SLSS is matched with a UE transmitting the PSBCH, it is able to demodulate the PSBCH using the SLSS. More specifically, if a network signals information on whether or not a UE transmitting the SLSS is matched with a UE transmitting the PSBCH or information on whether or not QCL is performed between the PSBCH and the synchronization signal, a reception UE can utilize a frequency offset, Doppler spread, etc. for demodulating the PSBCH using the synchronization signal.

As mentioned in the foregoing description, whether or not QCL is performed between the PSBCH and the synchronization signal can be determined according to a carrier on which a V2X operation is performed. For example, if a V2X operation is performed on 5.9 GHz, it is assumed that the PSBCH and the synchronization signal are QCLed. If a V2X operation is performed on 2 GHz, QCL is not assumed. More generally, information on whether or not QCL is performed between a broadcast channel transmitted by a UE for D2D and a synchronization signal can be indicated by a network via physical layer signaling or higher layer signaling or can be determined in advance according to an operation carrier.

Meanwhile, more specifically, QCL can be defined in various types. For example, it may assume QCL of Doppler shift and QCL of Doppler spread only. Or, there is a QCL type that assumes all of Doppler shift, Doppler spread, average delay, and delay spread. A QCL type used by a UE can be indicated by a network via physical layer signaling or higher layer signaling. Or, a QCL type can be determined in advance according to a carrier.

Information on whether or not QCL is performed between a PSBCH and an SLSS can be implicitly indicated by a format of the PSBCH. For example, a PSBCH for V2V is different from a PSBCH for legacy D2D in terms of a sequence type, a scrambling scheme, a DMRS position, and the number of DMRSs. When a specific PSBCH is used, it may assume in advance that the specific PSBCH and an SLSS are to be QCLed. Or, a network can signal a detail QCL behavior (parameters for which QCL is assumed) with the SLSS according to a PSBCH format to a UE via physical layer signaling or higher layer signaling.

Meanwhile, if a subframe interval is equal to or greater than a prescribed threshold, QCL assumption and/or whether to apply QCL can be differently configured between PSSCHs as well. For example, if PSCCH is transmitted within a prescribed subframe interval, QCL is assumed for Doppler spread, Doppler shift, and the like estimated in a previous subframe to perform demodulation using the QCL assumption. If the subframe interval exceeds the prescribed threshold, it may be able to independently perform demodulation without the assumption. This method may correspond a QCL behavior between PSSCHs. Yet, the method can be extensively applied to channels different from each other transmitted by the same UE. For example, if PSDCH is transmitted between PSSCHs, it may be able to perform demodulation by assuming QCL between the PSDCH and the PSSCH.

All or a part of the proposed methods can define a different QCL behavior according to a carrier. For example, when a V2V operation is performed on a plurality of carriers, a separate QCL behavior can be signaled according to each of a plurality of the carriers via physical layer signaling or higher layer signaling.

Meanwhile, in order to make the proposed method to be more generalized, the PSCCH may correspond to a channel on which a control signal is transmitted, the PSSCH may correspond to a channel on which data is transmitted, and the PSDCH may correspond to a channel on which information (e.g., discovery signal) on whether or not a specific UE exists, information on an ID, and the like are transmitted. The PSBCH may correspond to a broadcast channel and a sidelink synchronization signal may correspond to a signal of a form transmitted for performing synchronization. The channels are not restricted to the channel structure of 3GPP Rel. 12/13 of the present invention. In particular, QCL is assumed according to timing at which a control signal, a data channel, a discovery channel, a broadcast channel, a synchronization signal, or the like is transmitted and a UE type and the QCL assumption can be used for demodulation. The information can be determined in advance or can be signaled by a network or an RSU.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 10:
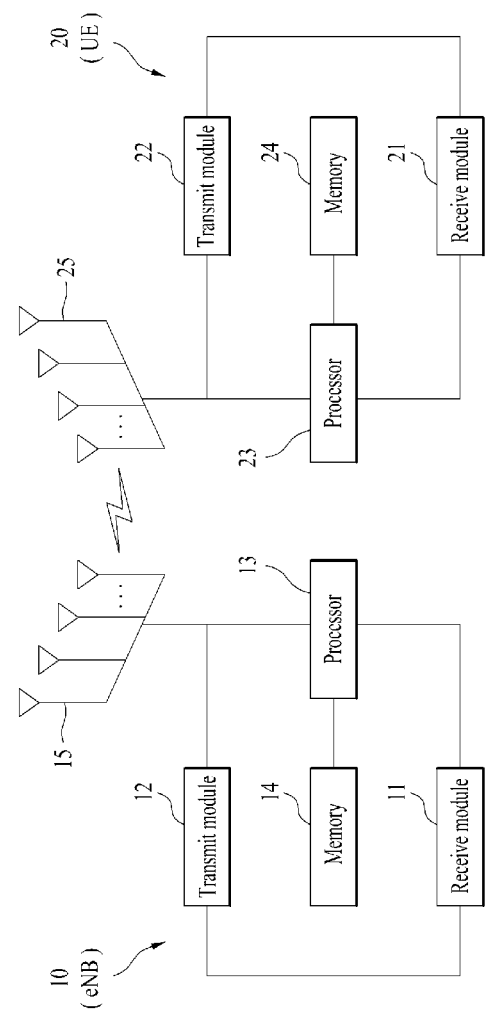
FIG. 10 is a diagram for configurations of a transmitter and a receiver.

FIG. 10 is a diagram illustrating configuration of a transmit point apparatus and a UE according to one embodiment of the present invention.

Referring to FIG. 10, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 10, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 13 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of receiving a signal, which is received by a first UE (User Equipment) from a second UE in a wireless communication system, comprising the steps of:
   receiving a PSCCH (physical sidelink control channel) transmitted by the second UE; and
   receiving a PSSCH (physical sidelink shared channel) associated with the PSCCH,
   wherein when the PSSCH is demodulated, the first UE uses QCL (quasi co-located) assumption according to a reception timing relation between the PSCCH and the PSSCH, and
   wherein when a PSBCH (physical sidelink broadcast channel) is demodulated, the first UE assumes that the PSBCH and an SLSS (sidelink synchronization signal) have the QCL assumption applied.

2. The method of claim 1, wherein if the PSCCH and the PSSCH are received in a same subframe, the first UE assumes that the PSCCH and the PSSCH have the QCL assumption applied.

3. The method of claim 1, wherein if the PSSCH is received within a predetermined time after the PSCCH is received, the first UE assumes that the PSCCH and the PSSCH have the QCL assumption applied.

4. The method of claim 3, wherein the predetermined time is differently determined according to a format of the PSCCH.

5. The method of claim 1, wherein if the first UE assumes QCL, the first UE considers that at least one selected from a group consisting of delay spread, Doppler spread, Doppler shift, average gain, average delay, and frequency shift is identically used not only for demodulating the PSSCH but also for demodulating the PSCCH.

6. The method of claim 1, wherein if the PSSCH is received within a predetermined time after the PSCCH is received, the first UE assumes a QCL behavior A when the PSSCH is demodulated and wherein if the PSSCH is received after the predetermined time after the PSCCH is received, the first UE assumes a QCL behavior B when the PSSCH is demodulated.

7. The method of claim 1, wherein a QCL behavior A corresponds to an assumption that Doppler shift, Doppler spread, average delay, and delay spread are common and wherein a QCL behavior B corresponds to an assumption that Doppler shift and Doppler spread are common.

8. The method of claim 1, wherein the PSCCH and the PSSCH are transmitted via a same antenna port.

9. The method of claim 1, wherein the first UE assumes that the PSBCH and the SLSS have the QCL assumption applied only when a UE, which has transmitted the SLSS, is identical to a UE, which has transmitted the PSBCH.

10. The method of claim 1, wherein the first UE receives information on whether or not the PSBCH and the SLSS have the QCL assumption applied from a network.

11. A first UE (User Equipment) receiving a signal from a second UE in a wireless communication system, comprising:
    a transmitter and a receiver; and
    a processor, the processor configured to receive a PSCCH (physical sidelink control channel) transmitted by the second UE, the processor configured to receive a PSSCH (physical sidelink shared channel) associated with the PSCCH,
    wherein when the PSSCH is demodulated, the first UE uses QCL (quasi co-located) assumption according to a reception timing relation between the PSCCH and the PSSCH, and
    wherein when a PSBCH (physical sidelink broadcast channel) is demodulated, the first UE assumes that the PSBCH and an SLSS (sidelink synchronization signal) have the QCL assumption applied.

* * * * *